United States Patent
Richard

[11] 3,879,697
[45] *Apr. 22, 1975

[54] WIDE ANGLE FISH DETECTOR

[76] Inventor: Joseph D. Richard, 3613 Loquat Ave., Miami, Fla. 33133

[*] Notice: The portion of the term of this patent subsequent to Sept. 4, 1990, has been disclaimed.

[22] Filed: June 18, 1973

[21] Appl. No.: 371,048

Related U.S. Application Data

[63] Continuation-in-part of Ser. No. 61,900, Aug. 7, 1970, Pat. No. 3,757,286.

[52] U.S. Cl.................... 340/3 D; 43/17.1; 340/3 T
[51] Int. Cl.............................................. G01s 9/70
[58] Field of Search........... 340/3 D, 3 T, 2; 43/17.1

[56] References Cited
UNITED STATES PATENTS

| | | | |
|---|---|---|---|
| 3,231,852 | 1/1966 | Kritz | 340/3 D |
| 3,541,717 | 11/1970 | Grayson | 340/3 D |
| 3,561,150 | 2/1971 | Silchenstedt | 340/3 D |

*Primary Examiner*—Richard A. Farley

[57] ABSTRACT

An ultrasonic Doppler system for detecting the presence of fishes and other moving aquatic animals over a wide angle at a discrete depth in a body of water. In a preferred embodiment, cylindrical piezoelectric transducers operating in the radial mode are used for transmitting and receiving ultrasonic energy omnidirectionally. Means are included for maintaining the cylindrical transducers with their longitudinal axes vertical to effect omnidirectional transmission and reception in the horizontal plane.

5 Claims, 8 Drawing Figures

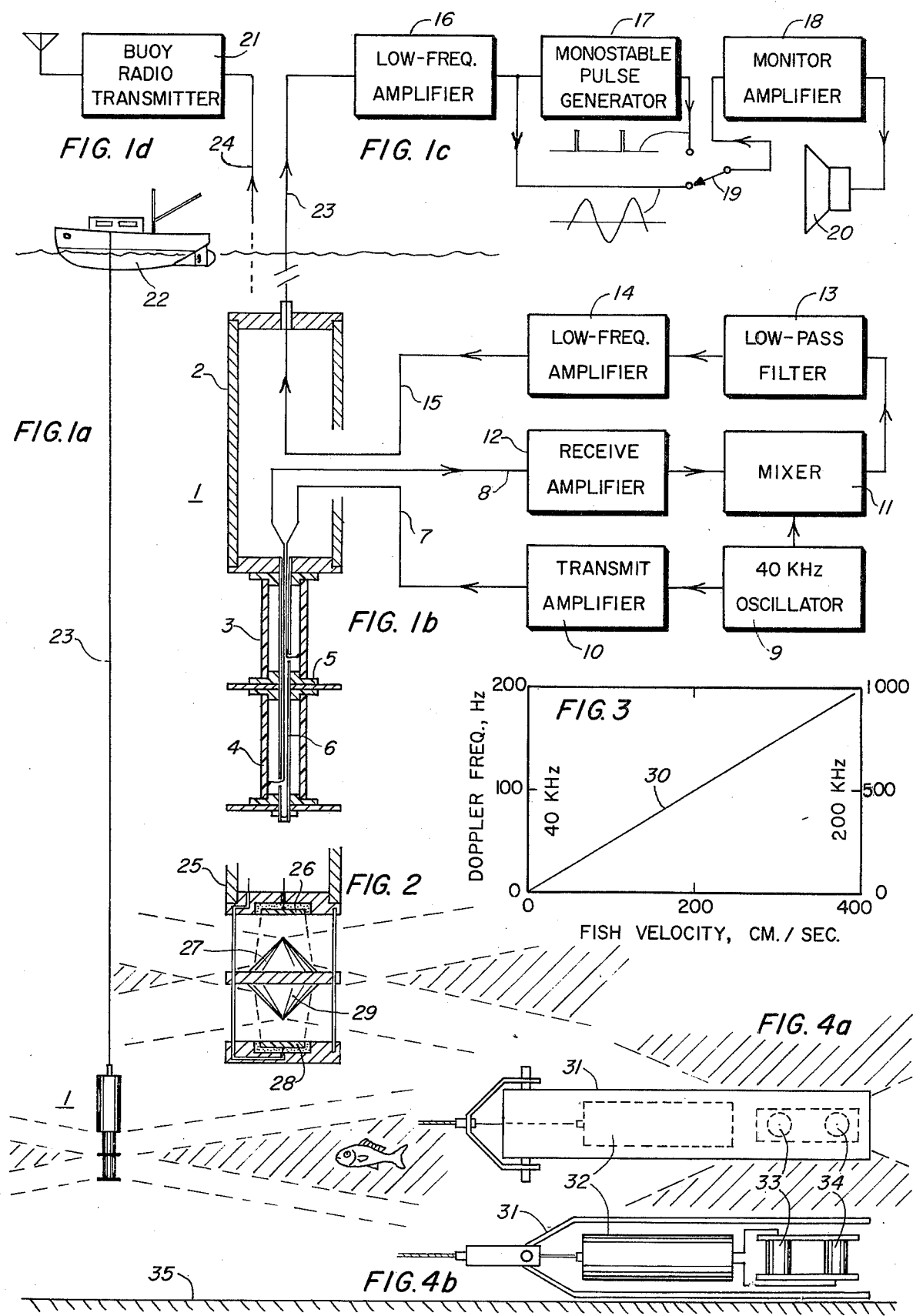

WIDE ANGLE FISH DETECTOR

CROSS REFERENCE TO RELATED APPLICATION

This application is a continuation-in-part of my copending application Ser. No. 061,900, filed Aug. 7, 1970, now U.S. Pat. No. 3,757,286.

BACKGROUND OF THE INVENTION

In the past, a wide variety of ultrasonic systems, generally called sonar, have been used for the detection and localization of fishes. Usually, pulse echo techniques have been used wherein a pulse of acoustic energy is transmitted and the presence of, and distance to, fishes or the like is indicated by the amplitude and time delay characteristics of the returning echo. Other sonar systems have employed the continuous transmission of ultrasonic energy and the detection of fish depends on the frequency change of the return signal. Such systems have included continuous transmission frequency modulated sonar and also continuous transmission Doppler sonar. In all of the above sonar systems, both the transmission and reception of acoustic energy is confined to a very narrow angle to maximize the range of fish detection. Because of the high directivity of fishery sonar systems used in the past, means have always been required for pointing the narrow beam in a specific direction toward some location where fishes might be located. Thus, in the past, no wide angle acoustic fish detection system has been available which could be suspended from a ship or buoy, or placed on the sea bottom, and left unattended without the need for some kind of complex and expensive scanning system.

SUMMARY OF THE INVENTION

The present invention provides a method and apparatus for detecting moving aquatic animals over an extremely wide angle, preferably omnidirectionally, in the horizontal plane, so that the presence of such animals at a particular depth can be ascertained or monitored for long periods of time without the need for scanning or otherwise directing the transducer elements. A continuous transmission ultrasonic Doppler technique is used so that only the presence of moving aquatic animals is detected. Localization or ranging information is not provided as in the conventional sonar system. Whenever moving aquatic animals relfect a part of the transmitted acoustic energy, a conventional Doppler circuit provides an output signal which varies according to the velocity of such movements. Doppler detection sometimes allows the identification of fish species, as the frequency components of the signal vary according to the characteristic swimming speed and tail beat frequency. In the preferred embodiment, radial mode cylindrical transducers are used for both transmission and reception to obtain omnidirectional beam patterns in the horizontal plane when the cylinders are maintained with their longitudinal axes vertical.

DESCRIPTION OF THE DRAWINGS

FIGS. 1a, 1b, 1c, and 1d are a schematic views of a Doppler fish detector according to the present invention in which coaxial cylindrial transducers are used to obtain omnidirectional beam patterns in the horizontal plane. The cylindrical transducers are maintained vertically when the fish detector is suspended by an electrically conductive cable from a vessel or buoy.

FIG. 2 shows schematically how disk transducers are used to obtain omnidirectional beam patterns in the horizontal plane according to an alternative embodiment of the present invention.

FIG. 3 shows the relationship between the velocity of a detected fish directly toward or away from the fish detector and the signal output frequency from the Doppler circuit of FIG. 1b.

FIGS. 4a and 4b show an alternate method for maintaining the cylindrical transducers in a vertical orientation by mounting them on a sled suitable for dragging across the bottom of a body of water containing aquatic animals.

DESCRIPTION OF THE PREFERRED EMBODIMENT

In FIG. 1a, a fishing vessel 22 is shown with an omnidirectional Doppler fish detector 1 suspended beneath it by means of an electrically conductive cable 23. FIG. 1b shows in sectional view and block diagram the underwater portion of the Doppler fish detector 1. Below the waterproof and pressure resistant housing 2, the cylindrical transmitting transducer 3 and the cylindrical receiving transducer 4 are coaxially mounted so that when the housing 2 is suspended by the electrically conductive cable 23, the cylindrical transducers 3 and 4 are maintained with their longitudinal axes vertical. When thus vertically oriented, transducers 3 and 4 transmit and receive in an omnidirectional pattern in the horizontal plane. The cylindrical transducers 3 and 4 are clamped within resilient spacers 5 and attached to the housing 2 by means of the rigid tube 6. The use of piezoelectric ceramic transducers for the transmission and reception of ultrasonic energy is well known in the art. Maximum transmitting efficiency is obtained when the cylinder 3 is driven by an electrical signal having the same frequency as its radial mode resonance. For example, a barium titanate cylinder having a diameter of 3.75 cm, has a radial resonant frequency of about 40 kHz. A considerably lower resonant frequency is obtained when a lead zirconate cylindrical transducer of equal size is used.

A 40 kHz electrical signal is generated by the oscillator 9 and amplified by the transmit amplifier 10 and conducted to the transmit transducer 3 by means of the wire 7. Radial vibrations of the cylindrical transducer 3 generate ultrasonic energy in an omnidirectional pattern horizontally into the surrounding water. Whenever part of the transmitted ultrasonic energy is reflected by a nearby moving object, it is converted to a corresponding electrical signal by the receiving transducer 4. The received signal is connected to the receive amplifier 12 by the wire 8. A difference frequency is generated within the mixer 11 when the received and oscillator signals are combined. The low difference frequency signal is separated from the higher frequencies by the low pass filter 13 and then amplified by the amplifier 14. The amplified low frequency Doppler signal is conveyed to a monitor system above the surface (FIG. 1c) by connecting wire 15 and the conducting waterproof cable 23.

In FIG. 1c, the low frequency Doppler signal is further amplified by the amplifier 16. The pulse generator 17 generates at least one pulse for each cycle of the Doppler signal so that normally sub-audible frequencies can be heard as a series of audible clicks. This allows slow moving animals to be detected even though their velocity is too low to result in an audio frequency Doppler signal. The switch 19 allows the selection of either of the signals, and the output of the monitor amplifier 18 is made audible by the speaker 20. As an alternative to the shipboard monitor system of FIG. 1c, a buoy radio transmitter is shown in FIG. 1d connected to the underwater Doppler fish detector 1 by means of the waterproof cable 24. The buoy radio transmitter 21 transmits the Doppler signal to some remote location, such as a shore station, so that the passage of fishes can be recorded for long periods of time. Such radio buoys are well known in the art and conventional sono-buoy is suitable for this purpose.

FIG. 2 shows a side sectional view of an alternative transducer construction for the omnidirectional Doppler fish detector. Transmitting and receiving transducers 26 and 28 are conventional piezoelectric ceramic disks which are mounted with their beam axes coaxial with the suspended housing 25. Such disks are normally used in the thickness mode and the beam pattern is sharply directional. For example, the barium titanate disks 26 and 28 are 1.25 cm in thickness with a resonance of about 200 kHz. Although normally highly directional, the transmitting and receiving beam patterns are made omnidirectional in the horizontal plane by the use of conical reflectors 27 and 29. Thus horizontally omnidirectional 200 kHz transmitting and receiving beams are obtained in the water surrounding the transducer assembly.

FIG. 3 shows the relationship 30 between the velocity of moving objects and the resulting Doppler signal frequency for the 40 kHz and the 200 kHz ultrasonic Doppler systems shown in FIGS. 1 and 2. Here the direction of movement of the reflecting object is assumed to be directly away or toward the transducers. The frequency of an ultrasonic signal which is received after reflection from a moving object, such as a fish, is shifted to a higher frequency when the object is approaching the transducers and to a lower frequency when the object is moving away from the transducers. When the signal of the original frequency is combined with the received reflected signal (as shown in FIG. 1b), a difference frequency is derived which is shown by the familiar Doppler relationship:

$$\Delta f = f\, 2(V)\, \cos\theta / c$$

where $\Delta f$ is the difference frequency (Doppler signal), $f$ the original signal frequency, $V$ the velocity of the reflecting object (such as a moving fish), $c$ the velocity of propagation of the ultrasonic signal in the medium (seawater), and $\theta$ the angle between the direction of the ultrasonic wave and the direction of movement of the reflecting object. Typical swimming speeds of fishes are about 3 body lengths per second, although higher speeds can be sustained for brief periods.

FIG. 4 shows transmitting and receiving cylindrical transducers 33 and 34, and waterproof housing 32, mounted on a sled 31 for dragging on the bottom of a body of water. When the sled 31 lies on the bottom in its normal stable position, the cylindrical transducers 33 and 34 are maintained in a vertical position as shown in the side view of FIG. 4b. Thus, their normal beam patterns would be essentially omnidirectional in the horizontal plane. However, as the two cylinders are mounted side by side, rather than coaxially as in FIG. 1b, there are some shadow effects forward and rearward along the sled. Nevertheless, very wide overlapping beam patterns are obtained laterally in the horizontal plane as shown in the top view of FIG. 4a.

Obviously, there are many possible variations in the construction and operation of the wide angle Doppler fish detector described herein. The power supply for the underwater Doppler detector of FIG. 1b can be a battery contained within the underwater housing 2. Preferably, however, the power supply is included with the monitor system above the surface and the necessary power conveyed to the underwater assembly by means of a conductor within the waterproof cable 23. Obviously, all of the circuitry shown in FIG. 1b could be located above the water surface, as an alternative, as only the ultrasonic transducers need be underwater. Ground return leads are not shown in the circuitry of FIG. 1b. Normally, the outer electrode surface of the cylindrical transducers are connected to ground. As an alternative, relatively longer cylindrical transducers can be used to increase the directivity in the vertical plane. Conversely, shorter cylinders can be used to increase the beamwidth in the vertical plane. Higher operating frequencies can be obtained by the use of cylinders of smaller diameter. For example, a barium titanate cylinder 1.9 cm in diameter has a radial mode resonance of about 89 kHz. The cylindrical transducers can also be operated at frequencies below radial resonance, but only with a considerable decrease in efficiency. Although only two alternate methods are shown in the drawings for maintaining the wide angle (e.g., omnidirectional) beam patterns in the horizontal plane, other suspension techniques could also be used. For example, the transducer pair could be attached to, or suspended under, the headrope of a trawl in such a way that a wide angle horizontal beam is effected. Various monitoring systems can be used as an alternative to the audible signal monitor shown in the drawing. Magnetic or graphic recordings of the output signal as a function of real time is desirable in many applications of the detection system.

It is understood that many modifications are possible and the invention is not limited to the specific embodiments disclosed nor otherwise except as set forth in the following claims.

What is claimed is:

1. Apparatus for detecting the presence of moving aquatic animals at a discrete depth within a body of water comprising:

a waterproof instrumented housing suitable for positioning at some discrete depth in a body of water;

means for continuously transmitting ultrasonic energy omnidirectionally in a least one plane into the water adjacent the said housing;

means for receiving ultrasonic energy reflected from objects in the water adjacent the said housing, said receiving means being omnidirectional in at least one plane;

means for deriving an output signal dependent on the frequency difference between said transmitted and received ultrasonic energy;

means for monitoring the frequency characteristics of said output signal; and means for orienting said ultrasonic transmitting and receiving means at a discrete depth in a body of water so that the aforementioned omnidirectional transmission and reception are in a horizontal plane.

2. Apparatus for detecting the presence of aquatic animals as described in claim 1 wherein the said instrumented housing is suspended from an electrically conductive waterproof cable; and the said ultrasonic transmitting and receiving means are coaxial piezoelectric cylinders maintained by said suspension in a vertical orientation, so that the said omnidirectional transmitting and receiving beam patterns are overlapping and maintained in a horizontal plane.

3. Apparatus for detecting the presence of aquatic animals as described in claim 1 wherein the said instrumented housing is mounted on a sled for towing on the bottom of a body of water; and the said ultrasonic transmitting and receiving means are piezoelectric cylinders maintained vertically oriented on the said sled so that the resulting omnidirectional transmitting and receiving beam patterns are maintained parallel to the aforementioned bottom.

4. Apparatus as described in claim 1 including a radio buoy connected to the said housing for transmitting the said output signal to a remote location.

5. The method of detecting the presence of moving aquatic animals at a discrete depth in a body of water comprising:

positioning an instrumented housing at a predetermined discrete depth in a body of water;

transmitting ultrasonic energy omnidirectionally in a horizontal plane into the water surrounding the said housing;

receiving reflected ultrasonic energy omnidirectionally in a horizontal plane surrounding the said housing;

deriving an output signal depending on the frequency difference between said transmitted and received ultrasonic energy;

and monitoring from above the surface of the aforementioned body of water the temporal variations in the characteristics of the said output signal.

* * * * *